United States Patent

[11] 3,567,840

[72] Inventor Harry C. Chamberlin
354 Winn Drive, Upland, Calif. 91786

[21] Appl. No. 738,495
[22] Filed June 20, 1968
[45] Patented Mar. 2, 1971

[54] TAPE DRIVE MECHANISM FOR ELECTRICAL MUSICAL INSTRUMENTS
12 Claims, 3 Drawing Figs.

[52] U.S. Cl. .......... 84/1.28, 84/1.17
[51] Int. Cl. .......... G10h 3/06, G10h 3/04
[50] Field of Search .......... 84/1.01, 1.28; 242/67.4, 67.5, 74, 182; 179/100.1

[56] References Cited

UNITED STATES PATENTS

| | | | |
|---|---|---|---|
| 2,366,147 | 12/1944 | May | 242/74 |
| 2,695,140 | 11/1954 | Haugaard | 242/74 |
| 2,910,298 | 10/1959 | Chamberlin | 84/1.28UX |
| 2,940,351 | 6/1960 | Chamberlin | 84/1.28 |
| 3,250,847 | 5/1966 | Chamberlin | 84/1.28 |
| 3,272,907 | 9/1966 | Chamberlin | 84/1.28 |

*Primary Examiner*—H.K. Saalbach
*Assistant Examiner*—T. Vezeau
*Attorney*—Whann & McManigal

ABSTRACT: A record tape drive mechanism for electrical musical instruments in which the tape is movable in opposite directions over a sound pickup, the tape having one end anchored on one side of the pickup, and its other end connected with a tape winding element on the outer side of the pickup and which is continuously driven by power means through a friction driving connection to wind up the tape to a start position as determined by the tape anchor. Also, on said one side there are normally ineffective power driven means for overriding a friction driving force and moving the tape in an unwinding direction from the winding element and away from the start position for reproducing the recorded sound. Manually actuated control means includes a manually movable key operable for effecting operation of the tape moving means for reproduction of sound from the record tape, and upon release permits rewind to its start position.

HARRY C. CHAMBERLIN
INVENTOR.
WHANN & McMANIGAL
Attorneys for Applicant
BY

TAPE DRIVE MECHANISM FOR ELECTRICAL MUSICAL INSTRUMENTS

BACKGROUND OF THE INVENTION

The invention relates to sound reproducing apparatus.

The present invention embraces improvements in the apparatus disclosed in my previous U.S. Letters Pat. Nos. 2,910,298; 2,940,351 and 3,272,907. These patents embody basic operative structural features which are pertinent to the improvements embodied in the present invention. In the above noted patents, the apparatus basically embodies:

a. The use of a record tape that was longitudinally divided into a number of successive sections, each of these sections having thereon one or more sound tracks, there being means for adjusting the record member so that selected sections would be positioned in operative relation to an associated pickup head, thus making it possible to reproduce a wide variety of sounds by use of the apparatus.

b. With tapes of the above character, means had to be provided for transporting the tape lengthwise in opposite directions in order to select a desired section. This was done by providing a pair of winding drums which were respectively disposed on opposite sides of the pickup head, these drums being operable through appropriate control to transport the tape from one drum to the other and to a position wherein a desired section would be positioned at a starting point with respect to the pickup head.

c. For reproducing the sound as recorded on the tracks within a particular tape section, only one feed roller is operated, the required amount of tape being supplied from the storage reservoir on the opposite side of the pickup device. The tape in the reservoir is contained within a looped portion of the tape which is maintained under tension and permits feeding of the required amount of tape length to the pickup head. As the reproduction is discontinued, the control permits the tape to be returned into the reservoir by means of the loop tensioning means.

With the basically designed structures as embodied in the above-mentioned patents, it is possible under certain conditions of operation to produce conditions which can interfere with the proper operation of the apparatus. For example, during normal transport of the tape from one drum to the other, when selecting the tape section to be reproduced, the tensioned loop within the reservoir remains unaltered. It has been discovered, however, that at times there may be a buildup of tape guide friction or static electricity which will cause a binding or a sticking of the tape in the vicinity of the roller which pulls the tape directly from the pickup head. However, with tape movement in this direction, the roller provides a positive pulling force on the tape and there will be no trouble experienced as a result of the transporting movement. Upon reversal of the transporting movement, when the other roller is withdrawing tape from the reservoir containing the tensioned loop, trouble may be experienced due to the fact that the two rollers are interconnected for unitary movement. Should the friction or sticking exist as mentioned above, the roller on which the tape is being wound may be forced to draw tape from the reservoir and tension the spring. However due to the unitary drive of the rollers, the other roller upstream of the stuck portion will continue to feed tape which will pile up and interfere with the proper operation of the device.

Having the above-mentioned difficulties in mind, the present invention proposes to overcome this problem by eliminating the tensioned loop portion of the tape path, and provide a single tape winding element which is driven through a friction connection, this winding element being operated in conjunction with the means for driving the tape during the sound reproduction cycle. The other end of the tape is fixedly anchored rather than being associated with a winding roller. That is to say, in the present invention the transport movement of the tape has been eliminated along with the attending problem of tape sticking due to static or friction.

SUMMARY OF THE INVENTION

The present invention relates generally to musical instruments and is particularly concerned with improved mechanism for driving the record tape.

Having the foregoing in mind, it is one object of the herein described invention to provide a record tape drive for sound reproducing apparatus and particularly for musical instruments, which incorporates a simplified and less costly structure, is more compact, and more dependable.

Another object is to provide an improved tape drive mechanism wherein the tape with a plurality of sound tracks thereon is anchored at one end and normally wound on a frictionally driven winding element at its other end to the extent permitted by the anchored end of the tape, and which in fully wound condition locates the tape tracks at a starting position.

A still further object is to provide a drive mechanism of the character stated above in combination with normally ineffective tape moving means which are controllable so as to override the frictional driving forces of the winding element and advance the tape in a direction to reproduce the sound recorded on the sound tracks, and which upon release will permit rewind of the tape back to the starting position.

It is also an object to provide an improved novel tape winding element of ring form to which an end of the tape is releasably attachable, the ring having an inner sleeve of compressible material such as felt or other suitable material in frictional engagement with a continuously rotatable shaft, and which can be adjusted with respect to its gripping engagement with the shaft by a single member such as a screw.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT

Figure 1:
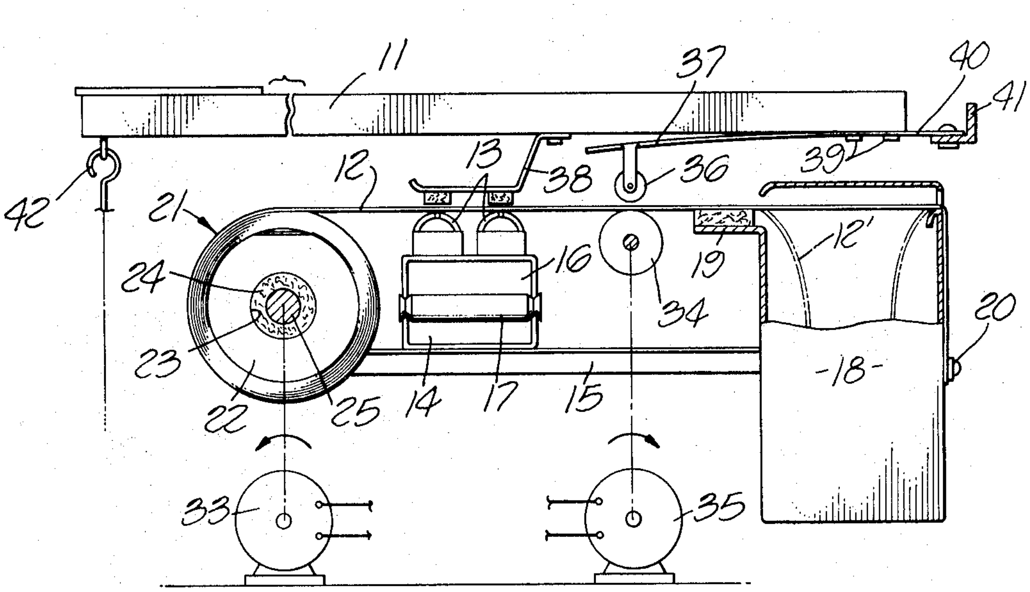
FIG. 1 is a side elevational fragmentary view partly in section, diagrammatically illustrating the arrangement of the tape drive mechanism embodied in the present invention.

Referring more specifically to the drawings, for illustrative purposes, the invention is disclosed in FIG. 1 as comprising a tape drive mechanism as generally indicated by numeral 10, which is constructed and designed for embodiment in electrical musical instruments of the type disclosed in the above-mentioned patents.

More specifically, as shown in FIG. 1, the mechanism is associated with the instrument keyboard which may consist of a plurality of keys such as generally indicated at 11, each of these keys being arranged to serve as a selector for a sound track of a prerecorded magnetic tape 12 which may then be reproduced in a conventional manner by being moved over associated pickup heads 13 forming a component in associated reproducing circuitry (not shown).

The magnetic tapes as utilized herein are provided with a plurality of longitudinally extending sound tracks which may vary as to number. Tapes in the present instance have included eight separate tracks, and in order to provide for selection of the desired track to be reproduced, the pickup heads are supported for transverse movement of the tape by means of conventional actuating means (not shown).

To permit the transverse movement of the pickup heads so as to be in playing position with respect to the desired tracks, the pickup heads are supported on a fixed lower support member 14 which is in turn carried by a frame member 15 of the device. The lower support member extends transversely of the tape and playing keys. Positioned directly under the pickup heads is an upper support member 16 which is movably supported for axial movement on underlying rollers 17 so as to be slidable with respect to the fixed lower support 14.

It will be appreciated that a number of tapes may be utilized in the musical instrument, and that in such case each tape will be provided with a tape drive mechanism such as disclosed in FIG. 1. Since each drive mechanism will be similar, it is believed that an explanation of a single tape drive mechanism will suffice to properly explain the present invention. It will be observed that the tape 12 extends on both sides of the pickup heads 13. Moreover, the tape which extends to the right is carried through the upper end of a tape receiving tank 18 into which the tape feeds when it is played or reproduced. Entrance of the tape at the top of the tank is guided by means of an extending lip 19 extending from the tank wall. At the opposite side, the end portion of the tape is carried through a suitable opening and thence down along the tank wall where it is anchored at its end, as indicated by the numeral 20.

Figure 2:
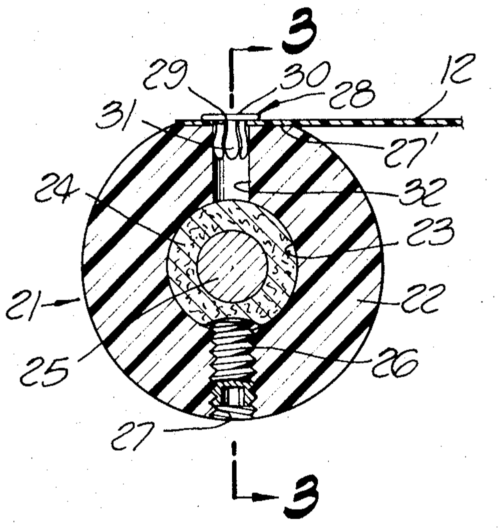
FIG. 2 is an enlarged transverse sectional view through the tape winding element showing features of construction of the friction drive arrangement and its adjusting means.
Figure 3:
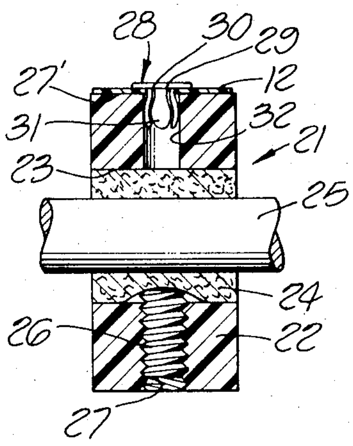
FIG. 3 is a sectional view of the same, taken substantially on line 3–3 of FIG. 2.

On the other side of the pickup heads, the tape 12 is wound upon tape winding means 21 which are constructed and operable in accordance with the features of the present invention. As best seen in FIG. 2, the tape winding means 21 comprises a winding element 22 of plastic or other suitable material which is formed as a ring-shaped member with a central axially extending bore 23 within which there is positioned a sleeve member 24 of a suitable material such as felt. This sleeve at its periphery is preferably bonded to the inner wall of the bore 23 in order that the sleeve will rotate with the winding element as a unit. The inner wall of the sleeve member surrounds and frictionally engages a central drive shaft 25. As thus arranged, the sleeve member provides a friction driving connection or a clutch between the winding element 22 and the drive shaft 25. A screw 26 mounted in threaded engagement with the inner wall of a radially extending bore 27 in the winding element provides a fine adjustment whereby the frictional forces may be closely varied and regulated simply by tightening or loosening of the screw. As the screw is tightened, it will compress the intervening material against the surface of the shaft 25 so as to increase the frictional forces, and conversely upon loosening the screw the frictional forces will be decreased.

In order to facilitate changing tapes, the associated end of the tape is releasably secured to the winding element. As will be seen, the winding element 22 is provided with a flat chordal surface 27′ at one portion of its outer periphery which is engageable by the end portion of the tape. A snap fastener 28 positioned in an opening 29 at the tape end has an outer head portion 30 and an inner end 31 having gripping fingers adapted to engage the wall of a radial bore 32 formed in the winding element. This end of the tape is thus releasably anchored to the winding element. The drive shaft 25, as diagrammatically illustrated in FIG. 1, has a driving connection with suitable power means, shown in this instance as comprising an electric motor 33 arranged to continuously drive the shaft 25 in a counterclockwise direction, the shaft as thus driven acting through the frictional driving connection described above to rotate the winding element 22 in a tape winding direction. This winding will continue until the tape is tightly stretched to the point permitted by the anchor at 20. This position is the start position at the beginning of each of the sound tracks carried by the tape. It will be apparent that in order to move the tape in a sound producing direction, the tape must be moved in the opposite direction over the pickup heads, that is in an unwinding direction of the winding element 22.

For such purpose, the tape on the right side of the pickup heads 13, as seen in FIG. 1, extends over a driving roller 34 which is continuously driven in a clockwise direction by the power means which in this case is indicated as a separate electric motor 35. While separate motors 33 and 35 have been shown, it will be appreciated that a single power means may be utilized. For each tape 12 having recordings thereon, there is an associated roller 36 adapted to deflect the tape downwardly into frictional engagement with the continuously rotating driving roller 34 which will then move the tape in a reproducing direction towards the right. During this movement of the tape, the driving effect of the roller 34 overrides the frictional driving forces applied to the tape winding means 21 tending to rotate the winding element in a winding direction. As the tape is moved towards the right, it will pass over the lip 19 into the interior of the tape receiving tank 18 wherein the tape folds back and forth in convolutions, one on top of the other, as indicated in part by the phantom line 12′. This operation continues so long as the roller 36 is depressed by means of a leaf spring 37 supporting the associated playing key 11. Simultaneously with the depression of the key, a spring 38 forces the tape into contact with the underlying pickup head 13.

When the key is released, and the roller 36 lifted so as to disengage the tape from the drive roller 34, the tape portions which have been played and moved into the tank 18 will be retrieved by the winding action of the tape winding means 21, which now becomes effective. The winding action continues until the tape again becomes taut at the start position as determined by the anchor 20.

As shown, the key 11 is normally supported in a raised position by the leaf spring 37 which is affixed at the right end of the key by securing elements 39, the spring having a projecting end 40 which is anchored by suitable means to a frame member 41 of the device. The key 11 may also be operated by a foot pedal (not shown) which may be connected to the lowermost end of a wire having a hook 42 suitably engaged with the left end of the key 11.

From the foregoing description, it is believed that it will be clearly apparent that the stated objects of this invention will be obtained by the structure according to the foregoing description.

Various modifications may suggest themselves to those skilled in the art without departing from the spirit of my invention, and hence, I do not wish to be restricted to the specific form shown or uses mentioned, except to the extent indicated in the appended claims.

I claim:

1. In a sound reproducing device:

a. sound pickup head;

b. a record member having a sound track with a starting point in a start position;

c. power driven means for moving said record member so that the sound track thereof will move relative to said pickup head;

d. manually actuated control means for effecting operation of said power driven means to move said record member away from said starting point when reproduction of sound from said record member is desired; and e. means operable by said power means upon release of said control means to return said record member to its start position, including a friction driving connection with said record member.

2. A sound reproducing device according to claim 1, wherein said record member comprises a tape, and the control means includes a manually operable key.

3. A sound reproducing device, according to claim 1 wherein the driving effect of the power driven means to move said record member away from said starting point, overrides the driving effect of the power means through said friction driving connection to move the record member towards said start position.

4. A sound reproducing device according to claim 1 in which the friction driving connection includes a power driven shaft, annular means rotatable on said shaft and frictionally engaged therewith, said annular means being connected with said record member and providing a winding element therefor.

5. A sound reproducing device according to claim 4, wherein the record member is a tape and has one end releasably connected with said annular means.

6. A sound reproducing device according to claim 4, wherein the annular means includes a flexible shaft gripping member, and means are provided for adjusting the gripping effect of said gripping member.

7. A sound reproducing device according to claim 6, wherein the means for adjusting gripping effect comprises a screw member operable to variably deflect a portion of said gripping member with respect to said shaft.

8. In a sound reproducing device:

a. a sound pickup head;

b. a record tape having a sound track movable over said pickup head, said tape having one end anchored on one side of said pickup head;

c. a tape winding element on the opposite side of said pickup head;

d. power means having a friction driving connection with said winding element continuously operable to wind up said tape to the extent permitted by said anchored end;

e. normally ineffective tape moving means on said one side of said pickup head operable by said power means for overriding the friction winding force and moving the tape in an unwinding direction from said winding element; and f. control means for effecting operation of said tape moving means, said control means upon release enabling rewind of said tape by said winding element.

9. A sound reproducing device according to claim 8, including a tank positioned adjacent said tape moving means for receiving unwound tape from said winding element.

10. A sound reproducing device according to claim 8, wherein the winding element is of ring formation surrounding a driving shaft, and has an inner sleeve of deformable material engaged with the shaft, and including a radial screw member in the ring adjustable to variably deform the sleeve material against the shaft and thus change the driving frictional forces.

11. A sound reproducing device according to claim 10, wherein said ring has a flat chordal peripheral surface engageable with an end of the tape; and a bore extending radially inwardly from said surface for releasably receiving a holding element engaged in an opening in said tape end.

12. A sound reproducing device, according to claim 8, wherein the winding element is of ring formation surrounding a driving shaft, and has an inner sleeve of deformable material engaged with the shaft, and including a radial member in the ring for deforming the sleeve material against the shaft and provide a driving frictional force.